United States Patent [19]

Lupien

[11] Patent Number: 4,982,313

[45] Date of Patent: Jan. 1, 1991

[54] LIGHT FIXTURE ASSEMBLY

[75] Inventor: Jean Lupien, Ste. Adèle, Canada

[73] Assignee: Distribution Nadair LTEE, Laval, Canada

[21] Appl. No.: 469,051

[22] Filed: Jan. 23, 1990

[30] Foreign Application Priority Data

Mar. 21, 1989 [CA] Canada ................................ 595986

[51] Int. Cl.[5] ........................ B60Q 1/00; F21V 11/00

[52] U.S. Cl. .................................. 362/368; 362/378; 362/437; 362/439; 362/443

[58] Field of Search ................ 362/368, 378, 433–448; 285/396, 397, 401, 402; 292/303; 403/347, 348; 248/222.3, 221.3

[56] References Cited

U.S. PATENT DOCUMENTS

| | | | |
|---|---|---|---|
| 951,598 | 3/1910 | Cruikshank | 362/435 |
| 1,743,847 | 12/1924 | Doane | 362/433 |
| 1,769,481 | 6/1929 | Zahm | 362/433 |
| 2,057,361 | 7/1935 | Bissell | 240/128 |
| 2,539,746 | 1/1947 | Masterson et al. | 240/132 |
| 4,082,327 | 4/1978 | Sting et al. | 285/401 |
| 4,426,677 | 1/1984 | Dennis | 362/438 |
| 4,708,370 | 11/1987 | Todd | 285/396 |
| 4,856,581 | 8/1989 | Santoro | 285/396 |

FOREIGN PATENT DOCUMENTS

| | | | |
|---|---|---|---|
| 130411 | 8/1910 | Canada . | |
| 827934 | 7/1949 | Fed. Rep. of Germany . | |
| 709936 | 1/1931 | France . | |
| 901168 | 1/1944 | France . | |
| 364524 | 11/1938 | Italy | 362/433 |
| 526453 | 9/1940 | United Kingdom . | |

*Primary Examiner*—James C. Yeung
*Attorney, Agent, or Firm*—Nixon & Vanderhye

[57] ABSTRACT

Disclosed is a light fixture assembly which includes a standard socket for receiving an electric light bulb and a sleeve with a cylindrical opening, the sleeve being rigidly mounted around the socket in order to conceal and protect it while at the same time supporting a lamp shade. The shade comprises a fixation collar sized to facilitate its insertion into the cylindrical opening of the sleeve. This basic structure which is known per se is improved in that the shade is rigidly fixed to the sleeve via the fixation collar by force-fitting male and female elements disposed respectively on the interior surface of the sleeve and the exterior surface of the fixation collar in order that the female elements receive the male elements when the lamp shade connection ring is forceably inserted into the cylindrical opening. Each female element is preferably disposed at the end of a circumferential groove opening at the leading edge of the ring to receive and guide the corresponding male element. This assembly is particularly advantageous because it is at once extremely simple and very efficient in resisting vibrations, thereby allowing the assembly to be used on a fixture encountering small movements such as for example, a ceiling ventilator. In addition, this assembly allows the lamp shade to be quickly and easily replaced by another which attunes better with the surrounding decor.

12 Claims, 2 Drawing Sheets

LIGHT FIXTURE ASSEMBLY

BACKGROUND OF THE INVENTION (i) Field of the invention

The present invention relates to a new collar support for a lamp shade. More precisely, the invention relates to a light fixture assembly equipped with a sleeve supporting a lamp shade improved in structure and in operation, the assembly being extremely simple while being resistant to vibrations.

(ii) Description of the prior art

The light fixing assembly according to the present invention includes a number of basic elements known in the prior art:

a standard socket connectable to a source of electric power for receiving and passing electric current to a light bulb;

a sleeve having a cylindrical opening, the sleeve being rigidly mounted around the socket to conceal and protect it while at the same time supporting a lamp shade or a reflector;

a fixation collar forming an integral part of the lamp shade or of the reflector, this collar being sized to allow its insertion into the cylindrical opening of the sleeve; and means for rigidly but removeably fixing the lamp shade or the reflector to the sleeve by the fixation collar.

This basic structure is, in itself, well known in lamp technology and has been the object of very numerous developments over the years as non-restrictively exemplified in Canadian patent No. 130,411 of 1910 and U.S. Pat. Nos. 2,539,746 of 1951 and 4,426,677 of 1984.

In these three patents, the only means described or suggested for rigidly fixing the lamp shade or the reflector to the sleeve are small screws, usually threefold, disposed at 120° intervals around the sleeve.

Though these screws may be efficient in retaining the lamp shade or the reflector to the sleeve, they do however suffer two major inconveniences. Firstly, they often spoil the esthetic quality of the lamp inasmuch as the heads of the screws are necessarily on the outside and thus visible. Furthermore, these screws tend to come undone when the lamp is fixed to a vibrating structure like, for example a ceiling ventilator.

In attempting to solve this last problem, ideas of varying ingenuity have been put forward. Here, reference is made to U.S. Pat. Nos. 1,743,847 of 1930; 1,769,481 of 1930 and 2,057,361 of 1936. It is however noteworthy that the fixation means described in these patents, mentioned here as non restrictive examples, do not retain the lamp shade or the reflector collar in the sleeve in a rigid manner. In fact, what is shown is merely a comparatively loose retention of one in the other.

German patent No. 827,930 describes a fixation means for a lamp shade or a reflector next to a support sleeve comprising at least three fingers held together by a ring. These arms, which have a certain elasticity, act as a sprung pincer by engaging a lip provided on an upper circumference of the lamp shade or the reflector in order to retain this latter. This fixation system which is of the "snap-on" type is very efficient because it allows easy installation and removal of the lamp shade or the reflector while retaining either solidly once clamped in position. This apparatus has however its own inconveniences, it being relatively complicated structurally and of minimal esthetic value.

The present invention is based on the discovery that all the above-mentioned inconveniences can be easily avoided if one uses a "clip-on" type fixing means for rigidly attaching the reflector or lamp shade to the sleeve by means of a fixation collar on the lamp shade or the reflector.

OBJECT OF THE INVENTION

The object of the present invention is therefore a light fixture assembly of the above-mentioned type wherein the fixation means of the lamp shade or the reflector to the sleeve is of the clip-on type and includes male and female elements disposed on the interior surface of the sleeve and the exterior surface of the collar to allow mating of the two elements when the ring of the lamp shade is forceably inserted into the sleeve opening. Each female element is preferably disposed at the end of the circumferential groove opening at the leading edge of the ring, this groove receiving and guiding a given male element as far as the female element in which male element is received.

SUMMARY OF THE INVENTION

In meeting this and other objects, the present invention provides a light fixture assembly also called hereinafter "lamp structure" comprising:

a socket connectable to an electric power source for receiving and electrically supplying an electric light bulb;

a sleeve provided with a cylindrical opening, the sleeve being rigidly mounted around the socket for concealing and protecting the socket and for supporting a shade;

a fixation collar integral to the shade, the fixation collar having a leading edge insertable into the cylindrical opening of the sleeve; and fixation means for detachably fixing the shade to the sleeve by means of the fixation ring;

wherein the fixation means is of a clip-on type comprising interlockable male and female elements mounted on the internal surface of the sleeve and on the external surface of the fixation collar so as to clip one surface to the other when the fixation collar is force-fitted into the sleeve, each of the female elements being sited at the end of a circumferential groove formed on the outside of the fixation collar and opening at the leading edge thereof, the groove receiving and guiding one of the male elements to the corresponding female element in which the one male element is intended to be force-fitted.

DESCRIPTION OF THE PREFERRED EMBODIMENTS

When the sleeve is made of metal, the male elements which preferably number three, disposed at 120° intervals, may simply be metal bosses on the interior surface of the sleeve. According to a first embodiment of this invention, the grooves in the collar are disposed at an angle to the plane of the sleeve opening, the desired fixation being achieved by lightly pushing the collar inwardly at the same time as turning it in the sleeve.

According to a second preferred embodiment of the invention, each groove has the form of a large "L" of which one arm opens to the leading edge of the collar. The desired fixation of the lamp shade or reflector is in this case achieved by inserting the collar axially into the sleeve after which the collar is rotated in the direction necessary to allow the male elements to mate with the corresponding female elements at the end of the grooves.

The lamp structure according to the invention is particularly advantageous for its extreme simplicity while efficiently achieving a rigid positioning of the lamp shade or reflector adjacent to the sleeve even though removal is simple.

The simplicity of this structure renders it extremely pleasing esthetically. In addition. the simplicity of its operation allows a user to install a reflector or a lamp shade on the sleeve or to change one already in position.

This makes the lamp according to the invention particularly interesting from a commercial point of view since the eventual purchaser may select a lamp shade or a reflector to his taste from a large variety and may then easily install his choice on the sleeve socket of the lamp which is in every case standard. This substantially reduces the inventory to be purchased. In addition, this same purchaser, once in possession of the lamp may modify its aspect totally by changing the lamp shade or reflector originally purchased for another without needing to buy a completely new article.

Of course, this advantage equally finds favor with the vendor since he too reduces his inventory while still offering a large choice to his customers. This advantage is passed on in turn to manufacturers of ceiling fans and other structures which normally incorporate lamps since the common socket and sleeve allow modification of the lamp shade or reflector while retaining a single central unit.

BRIEF DESCRIPTION OF THE DRAWINGS

The invention and its operation will be better understood on reading the following non-restrictive description of the invention in relation to the attached drawings which show two preferred embodiments.

DESCRIPTION OF THE BEST MODE

In the description and in the claims which follow reference is only made to a lamp shade attached to the supporting sleeve of the lamp according to the invention. However, the words "lamp shade" are intended to include all other analogous structures such as reflectors.

Figure 1:
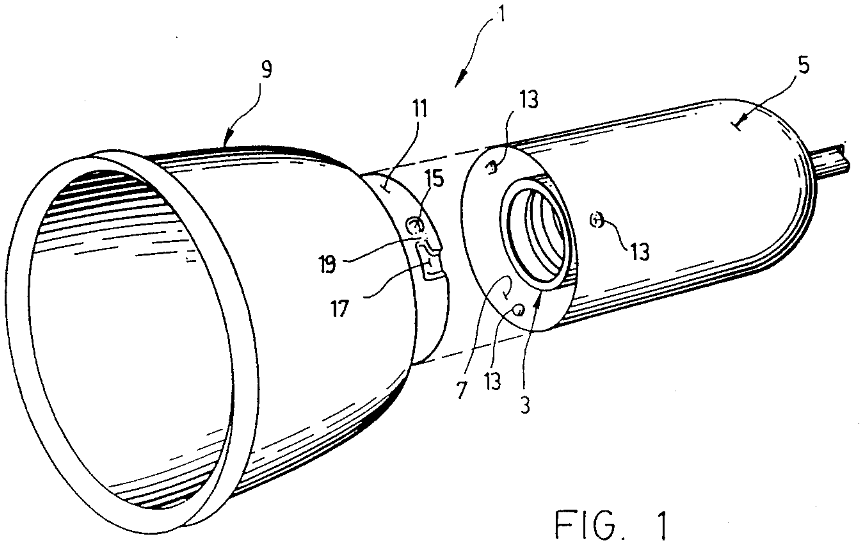
FIG. 1 is an open perspective view of a lamp according to a first embodiment.

The light fixture assembly or lamp 1 illustrated in FIG. 1 of the drawings includes a standard socket 3 connectable to a source of electric current by a wire or other connection means not shown. This socket 3 receives and passes current to a light bulb (not shown).

The lamp 1 also includes a sleeve 5 having a cylindrical opening 7. The sleeve 5 is rigidly mounted around the socket concealing and protecting this latter while also supporting a lamp shade 9.

The manner in which the socket is mounted in the sleeve is not in itself important. In fact, any known means may be used to achieve this mounting.

The lamp shade 9 may be of any material and of any shape. It must however be provided with a fixation collar 11 forming an integral part of the shade structure. The collar 11 must also be sized to allow its insertion into the cylindrical opening 7 of the sleeve 5 for positioning therein.

Means are provided for removably fixing the lamp shade 9 to the sleeve 5 using the fixation collar 11. According to the invention, these fixation means are of the clip-on type and include male elements 13 disposed on the interior surface of the sleeve. These means also include female elements 15 disposed on the exterior surface of the collar 11 allowing each male element 13 to be received and retained when the collar 11 of the lamp shade is forceably inserted into the sleeve opening 7.

In the particular embodiment illustrated in FIG. 1, the sleeve 7 is made of metal and the male elements 13 numbering three are made of simple rounded bosses obtained by crimping or other distortion of the metal and are disposed at 120° intervals in a plane parallel to the plane of the sleeve opening.

It is also possible that the sleeve be made of any other material and in particular a heat resistant plastic material.

Each female element 15 is disposed, at the bottom end of groove 17 having an inlet end opening at the leading edge of the collar 11 at which point the male elements 13 are received and are guided by the groove to the corresponding female element 15 in which the male element is to be retained.

Figure 2:
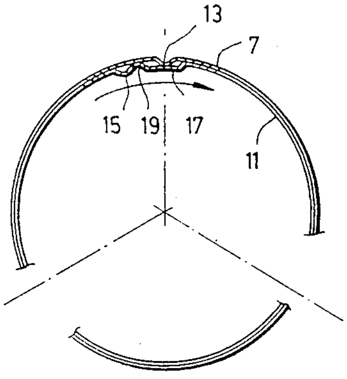
FIGS. 2 and 3 are cross-sectional views of the sleeve and the ring of the lamp illustrated in FIG. 1 on a plane parallel to the sleeve opening and on which lies the male element used to achieve the clip-on connection discussed.
Figure 3:
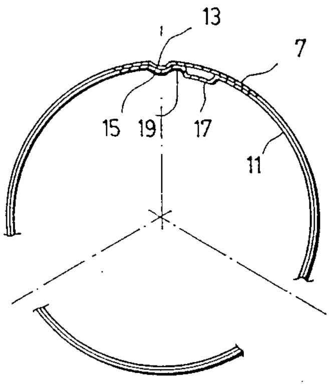

In the embodiment illustrated in FIG. 1, each groove 17 has a form of a "L" in which one of the arms is parallel to the fixation collar axis and opens at the leading edge of the collar. In the same embodiment, each female element is a small cavity of equal depth to the groove 17 and the rounded cavity being separated from the groove bottom and by a transfer zone 19 of intermediate depth (see FIGS. 2 and 3).

As may now be understood, the desired affixment of the lamp shade 9 to the sleeve 5 is easily achieved by aligning the opening of the grooves 17 with the male elements 13. Thus a brief axial insertion of the collar 11 into the sleeve 5 precedes rotation of the ring in the direction required to unite the male elements 13 with the female elements 15 at the end of the grooves 17 and to adapt these means after forceably passing the male elements 13 over the zones 19 of intermediate depth. This movement is shown by the arrow on FIG. 2 and by the final position illustrated in FIG. 3.

Once affixed, the male and female elements remain in place thanks to the zones of intermediate depth 19 which prevent any displacement. This results in the lamp shade 9 remaining solidly fixed to the sleeve with no risk of unscrewing or of becoming loose if vibration occurs.

Of course, the lamp shade may be removed equally simply by repeating the steps mentioned above but in reverse.

The collar 11 of the lamp shade 9 may be molded in glass or in plastic. It may also be made of metal in which case the grooves and female elements may easily be formed by stamping.

Figure 4:
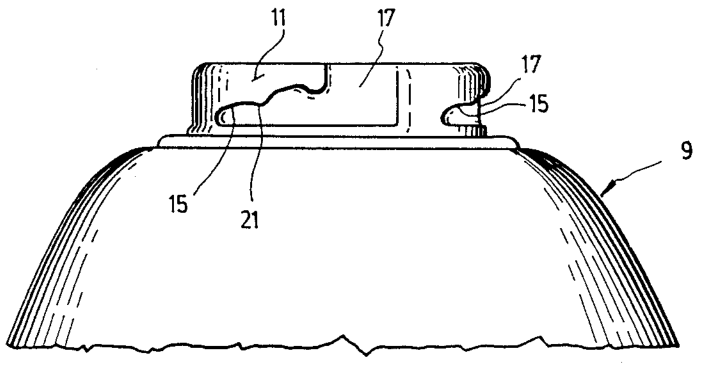
FIG. 4 is a side view of the fixation ring of a lamp shade according to a second embodiment of the invention.

The embodiment illustrated in FIG. 4 is identical to that described above inasmuch as the female elements 15 are disposed at the end of grooves 17. For this reason the same reference numbers have been used.

It is possible to see that the only difference between the embodiment of FIG. 1 and that of FIG. 4 lies in the small cavity 15 defining the female element which is separated from the extremity of the groove 17 by a small boss 21 provided in the edge of the groove 17 rather than by a zone 19 of intermediate depth. In this last case, the male element 13 moving along the groove 17 has to be forced over the small boss 21 in order to locate with the cavity 15. As shown, both embodiments describe a press fit attachment type or clip-on device.

It is to be understood that according to the invention, it is not strictly necessary that the male and female elements have the form illustrated. In fact, the shape of these elements is not important providing that one may be interlockingly received by the other. In addition, it is also to be understood that a groove in the form of a "L" is particularly preferred, this form being however not absolutely necessary. Thus, it is possible to visualize an analogous device in which the grooves in the collar are disposed at an angle to the plan of the sleeve opening, the desired affixment being in this case achieved by inserting the collar while at the same time rotating it in the sleeve. Of course, other possible embodiments are possible without departing from the spirit of the present invention. For instance, it is possible to invert the position of the male and female elements in order that they be found on the collar and the sleeve respectively rather than the other way round as described above.

I claim:

1. A light fixture assembly comprising:
   - a socket connectable to an electric power source for receiving and electrically supplying an electric light bulb;
   - a sleeve provided with a cylindrical opening, said sleeve being rigidly mounted around said socket for concealing and protecting said socket and for supporting a shade;
   - a fixation collar integral to said shade, said fixation collar having a leading edge insertable into the cylindrical opening of the sleeve; and
   - fixation means for detachably fixing said shade to said sleeve by means of said fixation collar;
   - wherein said fixation means is of a clip-on type comprising interlockable male and female elements one of said male and female elements mounted on the internal surface e of the sleeve and the other of said male and female elements mounted on the external surface of the fixation collar so as to clip one surface to the other when the fixation collar is force-fitted into the sleeve, each of said female elements being sited at the end of a circumferential groove formed on one of said sleeve and said collar and opening at the leading edge thereof, said groove receiving and guiding one of said male elements to the corresponding female elements in which said one male element is intended to be force-fitted.

2. A lamp according to claim 1, wherein the sleeve is made of metal and wherein the male elements are made of bosses formed by stamping.

3. A light fixture assembly according to claim 12, comprising three male elements disposed 120° apart in a plane parallel to the opening of the sleeve.

4. A light fixture assembly according to claim 3, wherein the grooves in the collar are disposed at an angle to the plane of the sleeve opening, the desired affixment being achieved by inserting the collar and thereafter rotating said collar in the sleeve.

5. A light fixture assembly according to claim 3, wherein each groove has the form of a "L" having one arm opening at the leading edge of the collar, the desired affixment of the lamp shade being achieved by inserting the collar axially into the sleeve and thereafter turning said collar in the direction necessary for said male elements to mate with said female elements at the ends of said grooves.

6. A lamp according to claim 1, wherein each female element consists of a small cavity of depth equal to that of the groove, said cavity being separated from the groove opening by a zone of intermediate depth.

7. A lamp according to claim 1, wherein each female element consists of a small cavity of depth equal to that of the groove, said cavity being separated from the groove opening by a zone of intermediate depth and wherein each groove has the form of a "L" having one arm opening to the leading edge of the groove to form said opening, the desired affixment of the lamp shade being achieved by inserting the collar axially into the sleeve and thereafter rotating said collar in the direction necessary to achieve mating of the male and female elements in said cavity at the end of the groove.

8. A light fixture assembly comprising:
   - a shade;
   - a socket for connecting to an electric power source for supplying current to a light bulb;
   - a sleeve member having a cylindrical opening and being mounted around said socket for concealing and protecting said socket and for supporting said shade;
   - a collar member solid with said shade, said collar member being sized to be insertable into said sleeve member through said cylindrical opening and having a leading edge; and
   - vibration-resisting means for detachably fixing said shade and said sleeve member together through said collar member; the improvement wherein said vibration-resisting fixing means is of the clip-on type and comprises:
   - a plurality of sets of male and female elements; said female elements located on an outer periphery of one of said color and sleeve members and said male elements located on an inner periphery of the other of said collar and sleeve members, wherein said elements ar sized and shaped such that said male elements can interlockingly fit into said female elements;
   - wherein said one of said collar and sleeve members includes on the outer periphery thereof, guiding grooves for guiding said male elements toward said female elements, each groove being uninterrupted and having an inlet end for a male element at said leading edge, and an opposite bottom end;
   - wherein each one of said female elements is located in the continuation of one of said guiding groove at the bottom end of said one groove and is separated therefrom by a transfer zone comprising a means for holding a corresponding male member solidly into said one female element; and whereby said transfer zone and said interlocking male and female elements comprise a means for preventing vibrations from causing said shade to fall from said sleeve member.

9. An assembly as claimed in claim 8, wherein each transfer zone is a transfer groove located at the bottom end of a relevant guiding groove and has a depth intermediate between those of the relevant female element and the relevant guiding groove.

10. An assembly as claimed in claim 8, wherein each female element is separated from said bottom end by a boss projecting laterally partly into the bottom end of the relevant guiding groove, said boss defining said transfer zone.

11. An assembly as claimed in claim 9, wherein said female elements and said guiding grooves are provided on said collar member and said male elements are provided on said sleeve member.

12. An assembly as claimed in claim 11, wherein said male elements are rounded bosses and said female elements are rounded cavities.

* * * * *